US012411976B2

United States Patent
Tang et al.

(10) Patent No.: US 12,411,976 B2
(45) Date of Patent: *Sep. 9, 2025

(54) SELF-CONSISTENT STRUCTURES FOR SECURE TRANSMISSION AND TEMPORARY STORAGE OF SENSITIVE DATA

(71) Applicant: DRFIRST.COM, INC., Rockville, MD (US)

(72) Inventors: Zilong Tang, Rockville, MD (US); James F. Chen, Naples, FL (US); Chen Qian, Vienna, VA (US)

(73) Assignee: DrFirst.com, Inc., Rockville, MD (US)

( * ) Notice: Subject to any disclaimer, the term of this patent is extended or adjusted under 35 U.S.C. 154(b) by 328 days.

This patent is subject to a terminal disclaimer.

(21) Appl. No.: 18/146,063

(22) Filed: Dec. 23, 2022

(65) Prior Publication Data
US 2023/0315894 A1 Oct. 5, 2023

Related U.S. Application Data

(63) Continuation of application No. 16/948,055, filed on Aug. 28, 2020, now Pat. No. 11,537,738, which is a
(Continued)

(51) Int. Cl.
*G06F 21/62* (2013.01)
*G06F 12/0862* (2016.01)
(Continued)

(52) U.S. Cl.
CPC ...... *G06F 21/6227* (2013.01); *G06F 12/0862* (2013.01); *G06F 12/0891* (2013.01);
(Continued)

(58) Field of Classification Search
CPC ............ G06F 21/6227; G06F 12/0862; G06F 12/0891; G06F 16/248; G06F 21/602;
(Continued)

(56) References Cited

U.S. PATENT DOCUMENTS 8,805,951 B1 8/2014 Faibish et al.
9,646,172 B1 * 5/2017 Hahn ............... G06F 21/602
(Continued)

FOREIGN PATENT DOCUMENTS

WO 2013128273 A1 9/2013

OTHER PUBLICATIONS

U.S. Appl. No. 16/948,055, filed Aug. 28, 2020, Pending.
(Continued)

*Primary Examiner* — Badri Narayanan Champakesan
(74) *Attorney, Agent, or Firm* — Brake Hughes Bellermann LLP

(57) ABSTRACT

Implementations provide self-consistent, temporary, secure storage of information. An example system includes short-term memory storing a plurality of key records and a cache storing a plurality of data records. The key records and data records are locatable using participant identifiers. Each key record includes a nonce and each data record includes an encrypted portion. The key records are deleted periodically. The system also includes memory storing instructions that cause the system to receive query parameters that include first participant identifiers and to obtain a first nonce. The first nonce is associated with the first participant identifiers in the short-term memory. The instructions also cause the system to obtain data records associated with the first participant identifiers in the cache, to build an encryption key using the nonce and the first participant identifiers, and to decrypt the encrypted portion of the obtained data records using the encryption key.

20 Claims, 7 Drawing Sheets

Related U.S. Application Data continuation of application No. 16/219,420, filed on Dec. 13, 2018, now Pat. No. 10,762,232, which is a continuation of application No. 15/992,736, filed on May 30, 2018, now Pat. No. 10,204,236.

(51) Int. Cl.
| | |
|---|---|
| *G06F 12/0891* | (2016.01) |
| *G06F 16/248* | (2019.01) |
| *G06F 21/60* | (2013.01) |
| *H04L 9/08* | (2006.01) |

(52) U.S. Cl.
CPC .......... *G06F 16/248* (2019.01); *G06F 21/602* (2013.01); *G06F 21/6245* (2013.01); *H04L 9/0866* (2013.01); *H04L 9/0869* (2013.01); *H04L 9/088* (2013.01); *H04L 9/0894* (2013.01); *G06F 2212/1052* (2013.01); *G06F 2212/45* (2013.01); *G06F 2212/6026* (2013.01)

(58) Field of Classification Search
CPC ......... G06F 21/6245; G06F 2212/1052; G06F 2212/45; G06F 2212/6026; H04L 9/0866; H04L 9/0869; H04L 9/088; H04L 9/0894
USPC .......................................................... 713/193
See application file for complete search history.

(56) References Cited

U.S. PATENT DOCUMENTS

| | | | | |
|---|---|---|---|---|
| 10,831,890 | B2* | 11/2020 | Rane ..................... | G06F 21/554 |
| 2005/0204017 | A1* | 9/2005 | Graves ................ | G06F 16/9535 |
| | | | | 709/219 |
| 2006/0101516 | A1* | 5/2006 | Sudaharan .......... | H04L 63/0263 |
| | | | | 726/23 |
| 2010/0191970 | A1* | 7/2010 | Singer .................. | H04L 9/0869 |
| | | | | 713/171 |
| 2013/0198522 | A1* | 8/2013 | Kohno ................... | G06F 21/62 |
| | | | | 713/182 |
| 2015/0006908 | A1* | 1/2015 | Mori ....................... | G06F 16/21 |
| | | | | 713/189 |
| 2015/0295907 | A1* | 10/2015 | Abrahamson ......... | H04L 9/0656 |
| | | | | 380/46 |
| 2015/0356314 | A1* | 12/2015 | Kumar ................ | G06F 21/6245 |
| | | | | 713/165 |
| 2016/0147945 | A1 | 5/2016 | MacCarthy et al. | |
| 2016/0277374 | A1* | 9/2016 | Reid .................... | H04L 63/0435 |
| 2017/0286698 | A1 | 10/2017 | Shetty et al. | |
| 2018/0102902 | A1 | 4/2018 | Yang et al. | |
| 2018/0124053 | A1* | 5/2018 | Mullender ............. | H04W 4/38 |
| 2019/0081990 | A1 | 3/2019 | Roy et al. | |
| 2019/0108141 | A1* | 4/2019 | Shields ................... | G06F 21/50 |
| 2019/0149593 | A1 | 5/2019 | Greetham | |
| 2019/0190947 | A1* | 6/2019 | Nsouli ............... | H04L 63/1441 |
| 2020/0012807 | A1* | 1/2020 | Lahav ............... | G06F 16/90348 |
| 2020/0159697 | A1* | 5/2020 | Wood .................... | G06F 16/162 |
| 2021/0342803 | A1* | 11/2021 | Yoo ...................... | G06Q 20/102 |
| 2022/0067147 | A1* | 3/2022 | Schmid .................. | G06F 21/52 |
| 2024/0039938 | A1* | 2/2024 | Yadav-Ranjan .... | H04L 63/1425 |
| 2024/0160533 | A1* | 5/2024 | Lakkundi ............ | H04L 63/1416 |
| 2024/0411314 | A1* | 12/2024 | Manouchehri ......... | G05D 1/226 |
| 2024/0411866 | A1* | 12/2024 | Djeyassilane ......... | G06F 21/552 |

OTHER PUBLICATIONS

U.S. Appl. No. 16/219,420, filed Dec. 13, 2018, Patented (U.S. Pat. No. 10,762,232).

U.S. Appl. No. 15/992,736, filed May 30, 2018, Patented (U.S. Pat. No. 10,204,236).

First Examination Report for Australian Application No. 2022204191, mailed Jul. 27, 2023, 2 pages.

Office Action for Canadian Application No. 3 102 932, mailed Jun. 12, 2023, 4 pages.

International Search Report and Written Opinion for International Application No. PCT/US2018/065488, mailed Mar. 14, 2019, 14 pages.

\* cited by examiner

SELF-CONSISTENT STRUCTURES FOR SECURE TRANSMISSION AND TEMPORARY STORAGE OF SENSITIVE DATA

RELATED APPLICATION

This application is a continuation of, and claims priority to, U.S. Non-Provisional application Ser. No. 16/948,055, filed Aug. 28, 2020, which is a continuation of U.S. Non-Provisional application Ser. No. 16/219,420, filed Dec. 13, 2018, which is a continuation of U.S. Non-Provisional application Ser. No. 15/992,736, filed May 30, 2018, titled "SELF-CONSISTENT STRUCTURES FOR SECURE TRANSMISSION AND TEMPORARY STORAGE OF SENSITIVE DATA," the disclosures of which are incorporated herein by reference in their entireties.

TECHNICAL FIELD

The present teaching relates to methods, systems and programming for the secure transmission and temporary storage of data. Particularly, the present teaching is directed to a flexible, self-consistent, data structure for securely and temporarily storing sensitive data. The self-consistent data supports faster retrieval and prevents hacking of the sensitive data.

BACKGROUND

Many organizations, such as banks, healthcare entities, universities, insurance companies, etc., deal with sensitive data. Sensitive data is data that is subject to restrictions on transportation, storage, and/or who has access to the data. Sensitive data is often subject to regulations, such as healthcare data subject to HIPAA and other regulations in the United States, financial data subject to FDIC and other regulations, and personally identifying data subject privacy regulations in the European Union. Not all sensitive data is subject to government regulations, but the data holder may desire to restrict the dissemination of the data.

In some cases, the sources of sensitive data may be distributed, so that an authenticated user must access several disparate systems to retrieve the data. As one non-limiting example, a physician prescribing a certain medication, such as, for example, a controlled substance under the local state law, may be required to or may want to view the controlled substance prescription history of the patient, but this information may not be available at one source. Currently in the United States, each state government operates its own state specific Prescription Drug Monitoring Program (PDMP) to track the dispensed prescription history of controlled substances. Each state may also select different PDMP data service provider to provide access to the state's PDMP data. To prevent controlled substance abuse, the physician may be required to access the PDMP data of the local state and may also want to access the PDMP data of the neighboring states, each state may require a separate authentication procedure and potentially using entirely different data service providers and different supporting systems.

However, access to the various PDMP data service providers is slow and cumbersome. Currently, the average response time from a state PDMP data service provider is between 6-15 seconds. Sometimes it can take more than 20 seconds to nearly 3 minutes if a patient has a long prescription history of controlled substances. The long wait time and the efforts required to login to very single state's PDMP provider discourages practitioners from complying with regulations to access the various states' PDMP systems. Moreover, in some cases, the sensitive nature of the data or restrictions applicable to the data may result in prohibitions on modifying the data, prohibitions on storing the data in a non-temporary manner, and prohibitions on transmitting the data in an unsecure manner.

SUMMARY

Implementations provide flexible, fast, and secure temporary storage and secure transmission of any data. Implementations include building an encryption key with information that is used to locate the data as well as using a nonce that is never transmitted. The nonce may be stored in fast, short-term memory, such as a cache register. The nonce may be located using (e.g., indexed by) participant identifiers in the fast, short-term memory. Participant identifiers are any data items used to make a particular request unique within a particular time frame. Participants can include a requesting entity and a subject entity. The system uses the participant identifiers to retrieve data from various data sources. The data sources can be local to the system or may be remote but accessible to the system over a network, e.g., the Internet or another network. The data can be sensitive data, e.g., data subject to regulations or restrictions on its transportation and/or storage. The system may format the data received and encrypt it with the encryption key. The system stores the encrypted data in a temporary memory separate from the memory storing the nonce. For example, the encrypted data may be stored in a cache. The encrypted data and the nonce are temporarily stored. In some implementations, the encrypted data and the nonce are periodically cleared, so that all records existing in the memory, e.g., cache and cache register, are deleted. The period may be short, e.g., an hour, four hours, etc. This period may be referred to as a refresh rate. In some implementations, the encrypted data and the nonce are stored for a pre-determined period of time. In other words, the encrypted data and/or the nonce may be associated with a time stamp used to determine an expiration time. The pre-determined time period may be small, e.g., a few minutes, a half hour, an hour, four hours, etc. When the expiration time arrives, the system may delete the encrypted data and/or the nonce. Accordingly, whether the data is automatically cleared periodically or deleted after some pre-determined time period, the storage of the encrypted data is temporary.

Implementations provide several levels of security for temporarily storing and transmitting sensitive data. For example, the procedure for building the encryption key is not known outside of the system, and can be configurable, so even if the participant identifiers are intercepted or identified by hackers, the hackers do not have the instructions for building the encryption key from the participant identifiers. In some implementations, the participant identifiers may be hashed before being stored, adding an extra layer of security. The encryption algorithm used for encryption/decryption can also be configurable, e.g., so that requests for different clients use different algorithms, or data from different sources are encrypted with different algorithms. In some implementations, the procedure for building the encryption key may be based on the encryption algorithm used. Thus, the encrypted data stored in the cache may be encrypted using different algorithms, which further increases data security. Additionally, the nonce that is used in building of the encryption key is never transmitted, so it cannot be intercepted by bad actors, further increasing the security of the encrypted data. Finally, the encrypted data is only temporarily stored, e.g., expires and is deleted periodically or after a predetermined time, essentially eliminating the opportunity for a breach.

Implementations also reduce the latency for accessing the data. For example, some implementations use a pre-fetch process to reduce the query latency. Query latency is the time between a user's request to view the data and the displaying of the requested data to the user. For example, implementations may use an API that observes (with client permission) data input by the client and, when the user has provided values for all data items included in the participant identifiers, the system may use the participant identifiers to begin to make a query request to obtain data likely to be requested by the client. This obtained data is encrypted and temporarily stored, as disclosed herein, and can be recalled quickly for presentation. For example, latency can be reduced from minutes to seconds, depending on the type of data source the data is requested from and the number of different data sources that store relevant data.

Implementations address a need, arising from the opioid overdose endemic, to create technical solutions to make current PDMP systems fast, secure, and easy to use. As discussed above, response times of several seconds results in resistance to using existing tools. Using the technical solutions described herein, such as, for example, the use of encrypted caching, disclosed implementations eliminate the need to log into one or more PDMP systems and reduce the average time to get the requested data in viewable form from 6-20 seconds per state PDMP to 5-10 milliseconds for all requested state data. Thus, implementations provide results significantly (orders of magnitude) faster than existing systems.

Moreover, implementations can pre-fetch (gather) all data for a subject entity, which eliminates duplicated requests. A duplicated request occurs when the requesting entity (e.g., the physician) has to request a second page of data from the data source for the same subject entity. Duplicated requests for a subject patient have been found to occur 5-15 times per physician access in existing PDMP systems. Using disclosed techniques, duplicated requests are directed to the encrypted caching rather than PDMP systems directly, saving significant bandwidth and further decreasing query latency. Furthermore, implementations can pre-fetch data from several sources concurrently, further decreasing query latency. For example, implementations can fetch data from Maryland and Ohio concurrently. Using existing systems, a physician would need to access the data for Maryland and Ohio serially.

Additionally, the technical solution as described below satisfies data restrictions, such as prohibitions on modifying the PDMP data, prohibitions on storing the data in a non-temporary manner, and prohibitions on transmitting the data in an unsecure manner. Using a self-consistent design, the securely encrypted data can only be decrypted, and become readable by an original requestor, i.e., one who provides the original request data elements, i.e., the participant identifiers. A self-consistent design describes a system where all data elements of a request and the responsive data are encapsulated, so that only the person who knows the original request (the requesting entity) can access the data. In other words, access to the data fetched for a request includes knowledge of the request itself, making implementations secure. Put another way, implementations apply the self-consistent principal where the query result (data fetched), the encryption key, and the query request are consistent, ensuring no modifications are made from the point of encryption when the query results are obtained to the point of decryption when the query result are rendered.

While the benefits above use PDMP systems as an example, these benefits inure to other fields of use. For example, a police investigatory can benefit from disclosed implementations because of the ability to pre-fetch data about a criminal suspect from multiple data sources, the pre-fetched data being securely, but temporarily stored.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
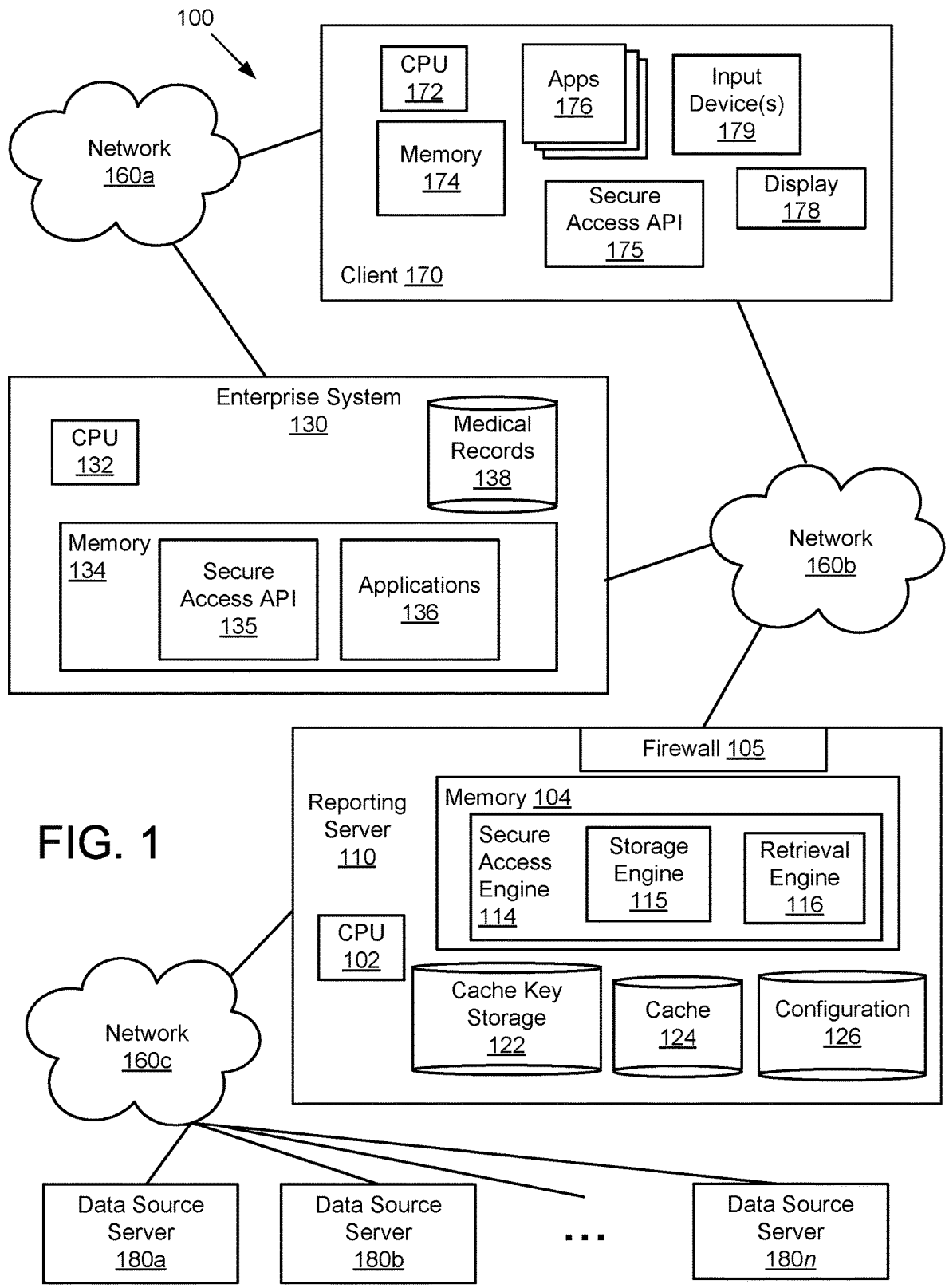
FIG. 1 describes a high level depiction of a system configuration, according to a disclosed embodiment.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Example embodiments are described with regard to health related entities as sources of health related data, however, the embodiments are not limited to the healthcare industry and the inventive concepts can be applied to any setting in which fast access to distributed sensitive data is desired. For example, the disclosed techniques may be used in financial industries, educational institutions, criminal justice systems, corporations, etc., that deal with sensitive or regulated personal and/or financial information.

To solve the problems associated with timely reporting of distributed sensitive data, such as the need to log into multiple disparate portals, the latency in obtaining relevant data from these disparate portals, and challenges relating to secure transmission of data from the sensitive data sources, implementations provide a system that may pre-fetch data from one or more distributed sources, encrypt the pre-fetched data with a self-consistent encryption key built using parameters later used to request this data (i.e., participant identifiers), combine it with keeping the encrypted data only temporarily.

When the user makes an actual request for the data, the system may re-build the encryption key from the query parameters, fetch the encrypted data, decrypt the data with the encryption key, format the data for presentation to the requestor, and provide the result to the requestor. The encryption key includes a nonce, e.g., a random data string generated at the reporting server and never transmitted outside the reporting server. In one implementation, the nonce may include a time stamp, the time stamp may, for example, be associated with the nonce creation time. In some implementations the time stamp may be manipulated (e.g., rotated, masked if used as part of the nonce. The encryption key is generated using the nonce, combined with participant identifiers. The participant identifiers represent one or more data fields used to uniquely identify the requesting entity and a subject entity. In some implementations, the requesting entity and the subject entity are the same entity, e.g., if the requesting entity is seeking information about himself or herself. In general, a requesting entity performs a service on behalf of the subject entity. The query parameters include the participant identifiers but may also include additional parameters used to filter the prefetched data. In some implementations, the reporting server may not store the encryption key itself; instead the reporting server build the encryption key as needed, which increases the security of the encrypted data stored temporarily at the reporting server. In some implementations, the reporting server may store the nonce for a short period of time. The encryption key may also never be transmitted outside of the reporting server, which also contributes to the security of the encrypted data, as there is less chance of the encryption key being intercepted. Implementations may also use a tree data structure to store the encrypted data, partitioning the data into different nodes identified by meta-information. Using the meta-information as filters, the tree data structure makes the assembly of a report scalable and customizable.

As shown in FIG. 1, a networked environment 100 may include a number of computing devices that are in data communication with each other through a network 160 or a series of networks 160. The networks 160 may include the Internet, a local area network (LAN), a wide area network (WAN), a mobile network, an intranet, etc., or some combination of these. For example, network 160a may be a LAN, a mobile network, an intranet, or the Internet, allowing client 170 to communicate with enterprise system 130. Network 160b may be any combination of the Internet, a WAN, a LAN, a mobile network, etc., allowing the enterprise system 130 and/or the client 170 to communicate with reporting server 110. In some implementations, the network 160b represents more than one network, e.g., the Internet and a WAN or the Internet and a mobile network. Similarly, network 160c, which allows the reporting server 110 to access one or more data source servers 180, may be one of or any combination of different networks.

The computing devices in environment 100 may include servers, such as enterprise system 130, reporting server 110, and data source servers 180. The computing devices may also include client devices, such as client 170, which provide a user interface, for example via a browser or through a mobile application, for a human user to access various applications on available over a network 160, such as the Internet or an intranet.

The enterprise system 130 may be a web-based enterprise system for an organization, such as a financial organization, an educational institution, or a healthcare organization, such as, for example, a hospital, a clinic, or an electronic medical records system (EMR) for a healthcare provider's office. The enterprise system 130 may require its users (e.g. employees or customers) to login with login credentials (typically a username and a password or token) before accessing the records and applications of the enterprise system 130. The enterprise system 130 may include a computing device, such as a computer, a server or a number of communicatively connected distributed servers, a mainframe, etc., that has one or more processors 132 (e.g., a processor formed in a substrate) configured to execute instructions stored in memory 134, such as main memory, RAM, or disk. The instructions may be stored in modules or engines and may provide functionality typical of an enterprise system, including an EMR.

The enterprise system 130 may include one or more applications 136 that provide access to data, such as medical records 138. In some implementations, the enterprise system 130 may also include a secure access application program interface (API) 135. API 135 includes code configured to communicate with and access reporting server 110. The API 135 may include computer code that monitors data input by the client 170 and, when sufficient participant identifiers have been populated, may initiate a pre-fetch process using the participant identifiers, which greatly reduces query latency time. Determining that sufficient participant identifiers have been populated and initiating the pre-fetch process may be referred to as a data input event. Participant identifiers include any data that make a request unique within a predetermined time. For example, participant identifiers may identify a subject entity (e.g., a person, animal, or other entity), such as, for example, a patient, pet, client, etc., for whom information is sought from data source servers 180. The participant identifiers may also include data that identify the requesting entity, such as, for example, the prescribing physician. In some implementations, the participant identifiers may also include a device identifier for the client 170. The device identifier is considered an identifier of the requesting entity. Thus, some participant identifiers may be input by the requesting entity and some may be data obtained about the requesting entity, e.g., requestor identification data obtained from authentication or login data, or data obtained from the device or system that the requestor was using. In some implementations, information about the subject entity is optional. In other words, the requesting entity may also be the subject entity, so no additional information is needed to identify the subject entity.

The request may be an explicit request or an implicit request. In an example of an explicit request, the user of client 170 may input data used in the participant identifiers and select a control that causes the API 135 to send a fetch request to the reporting server. In an example of an implicit request, the API 135 may automatically (e.g., without the user selecting a control) send a fetch request after observing sufficient data input, typically information to identify the subject person about whom the request is directed. In another example, the API 135 may relay a view report request from the client 170/enterprise server 130 to the reporting server 110.

In some implementations, the API 135 may only be accessible if client 170 has completed successful authentication with the enterprise system 130. In some implementations the client 170 is a terminal within the enterprise system 130. In some implementations, the client 170 may have a copy of the API, e.g., secure access API 175. In such implementations, the API 175 may communicate directly with the reporting server 110, e.g., via network 160b. In some implementations, the enterprise system 130 and the client 170 may be part of a client-server system, e.g., a web-based healthcare system.

The client 170 may be a personal computing system, a terminal, a laptop, a tablet, a wearable computing device (e.g., a smart watch or smart glasses), or another mobile device such as a smartphone, an iPad or an iPad mini. The client 170 may include one or more processors 172 (e.g., a processor formed in a substrate) configured to execute instructions stored in memory 174, such as main memory, RAM, flash, cache, or disk. The client 170 may also include input devices 179, such as a microphone, a keyboard (virtual or physical), a touch screen, a mouse, a camera, a voice recorder, etc. The client 170 also includes a display 178 or other output device. The client may also include one or more applications 176 that perform various functions, e.g., a browser, a word processing program, a spreadsheet program, an email client, a mobile application etc.

In some implementations, the client 170 may include a secure access API 175, which performs functions similar to those discussed above with regard to secure access API 135 and is configured to communicate directly with reporting server 110. The client 170 may communicate with the enterprise system 130 via a network 160a. In some implementations, the client 170 is a terminal within a local network for the enterprise system 130 and does not have direct access to the Internet or other computing systems. In other words, the client 170 may be behind a firewall inside enterprise system 130 and enterprise system 130 may block or enable communications of client 170 with other computing systems.

The environment 100 also includes a reporting server 110. The reporting server 110 may include a computing device, such as a computer, a server or a number of communicatively connected distributed servers, a mainframe, etc., that has one or more processors 102 (e.g., a processor formed in a substrate) configured to execute instructions stored in a memory 104, such as main memory, RAM, cache, cache registers, disk, etc. The reporting server 110 may be configured to handle high traffic, e.g., twenty to thirty thousand requests an hour. Accordingly, the reporting server 110 may include a number of different computing devices coordinated by a cluster controller or similar configuration. The reporting server 110 may be secured behind a firewall 105. The firewall 105 may prevent unrecognized systems from sending requests to the reporting server 110.

The reporting server 110 includes a secure access engine 114. The secure access engine 114 is a module or program that interacts with the requests from secure access API 135 and/or secure access API 175. In some implementations, the secure access engine 114 may include one or more modules, such as storage engine 115 and retrieval engine 116. The storage engine 115 may be configured to use participant identifiers to collect/prefetch, encrypt, and store data for generating a data report in response to a subsequent report request. The retrieval engine 116 may be configured to use participant identifiers to retrieve the data, decrypt the data, use the data to generate the requested report and provide the report to the requestor, e.g., the user of client 170. Implementations may include fewer or more modules than those illustrated in FIG. 1.

A request from the API 135 or 175 includes participant identifiers. The participant identifiers are one or more data fields that represent a unique request. Some of the participant identifiers are used by the reporting server 110, for example, as query parameters, to request data from the data source servers 180a-n. Some of the participant identifiers may not be needed to request data from the data source servers, but are required by the reporting server 110, such as, for example, fields identifying the requestor person.

The secure access engine 114 uses some or all of the participant identifiers to build an encryption key, as discussed in more detail below. The secure access engine 114 may also be communicatively connected to one or more data source servers 180 via network 160c. For example, the secure access engine 114 may be configured to request data from data source server 180a, data source server 180b, and data source server 180n (n being any positive integer). As one example, data source server 180a may be a server for an organization that collects and reports prescription drug monitoring program (PDMP) data, such as a server operated by APRISS, DR. FIRST, HID, CRISP, etc.

The secure access engine 114 may provide each data source server 180 with parameters and receive a response that includes data relevant to the parameters. For example, the parameters may specify information identifying a patient and the data source server 180a may provide, in return, information about prescriptions filled for anyone matching the parameters. One or more of the data source servers 180 may provide the response in an HTML format, or in other words, in a web-page format intended for viewing by a user. One or more of the data source servers 180 may provide the response in a data transfer format, such as XML or NIEM (UN defined format), etc. One or more of the data source servers 180 may provide the response in a proprietary format. In some implementations, the secure access engine 114 may normalize and format the data received before encrypting it. For example, PDMP data received from neighboring states may be normalized and formatted to conform to the local state standard. The local may be the state from which the requestor made the request. In another implementation, the local state may be the state where the subject patient resides.

In some implementations, the secure access engine 114 may encrypt the data as received. In some implementations, some data types (e.g., a proprietary format) may be normalized and formatted before encryption while others (e.g., an XML file) may be encrypted as received. The secure access engine 114 may be configured to request data from a plurality of data source servers 180 concurrently. Thus, for example, the secure access engine 114 can send a request to data source server 180a and 180n simultaneously.

The secure access engine 114 may also obtain data responsive to one or more participant identifiers from local data sources (not shown). For example, a local data source may provide a lookup table that includes current public profiles of physicians (e.g. requestor) licensed in a particular state or states. A local data source may also provide a patient (e.g., subject) lookup table that includes names of known residents of a particular state or states. Thus, the secure access engine 114 may be able to add additional information to the data provided by one or more of the data source servers 180. The secure access engine 114 encrypts the data obtained in response to an API request, e.g., from API 135 or 175 using an encryption key built using participant identifiers, i.e., the parameters received from the API 135 or 175, and a nonce.

A nonce is data created and used for one specific instance. In this case, the secure access engine 114 generates the nonce for the participant identifiers, which represent a particular request. A request relates to a particular subject person/entity and a particular requestor, e.g., patient/physician, student/administrator, customer/teller, etc. The nonce can include a time stamp, a random number, a string of randomly generated characters, some combination of these, or something similar. The secure access engine 114 combines the nonce with participant identifiers to build the encryption key. The secure access engine 114 may not use all participant identifiers in building the encryption key. Accordingly, a subset of the participant identifiers may be used in building the encryption key. Moreover, the participant identifiers used to build the encryption key and the nonce can be concatenated in any order, can be interleaved, or can be manipulated or transformed as part of building the encryption key. For example, the participant identifiers may include a date of birth, a patient's name, a physician's national provider identifier (NPI) number, a Drug Enforcement Administration (DEA) number, and/or a medical license number for the physician from a particular state. In one example, the secure access engine 114 may use the nonce, patient's name, date of birth, NPI number, DEA number, and medical license number to build the encryption key.

In some implementations, the method of building the encryption key may be configurable. In other words, the reporting server 110 may have a plurality of methods for building an encryption key that are stored, for example in configuration data store 126. The secure access engine 114 may select one of the methods based on a value of one or more of the participant identifiers or some other metadata for the request, such as an identifier for the enterprise system 130. In some implementations, the encryption key may be dependent on an encryption method used. Accordingly, the secure access engine 114 is configured to build multiple encryption keys. The method used to build an encryption key may indicate which participant identifiers are used, in what order the participant identifiers and nonce appear, how they are combined, and whether any or all of the participant identifiers are transformed in building the encryption key. Transforming a participant identifier includes operations such as performing an XOR operation on the data, shifting all bits right or left a predetermined number of positions, etc. The secure access engine 114 can use any method of building the encryption key so long as the same method can be identified and used in response to a subsequent view report request using the same participant identifiers and metadata. In some implementations, the secure access engine 114 may normalize one or more of the participant identifiers prior to use in building the encryption key, e.g., converting an alpha-numeric birthdate to just numeric, formatting the birthdate into YYYMMDD format, removing spaces or special characters from names, etc. In some implementations, the encryption key may be a 256-bit key. The nonce may be of a size sufficient to fill out the encryption key. For example, if the used to build the encryption key use 200 bits, the nonce may be 56 bits. Of course, longer or shorter encryption keys may be used to meet system requirements.

The secure access engine 114 uses the encryption key to encrypt the data obtained from remote sources, e.g., data source servers 180 as well as any data obtained from local sources. In some implementations, the encryption method may be configurable. For example, the method used to encrypt the data using the encryption key may be dependent on one or more metadata received with the request, or a source of the data. For example, a different enterprise system 130 may select different encryption methods. As another example, the encryption method may be dependent on a source of the data, e.g., data from different sources having different encryption methods. The source of the data may be obtained from meta-information in the data record sent by the data servers 180. Configuration data store 126 may store and provide information used to select an encryption method.

In some implementations, the secure access engine 114 may combine all data received from a particular data source server 180 into a single data structure and encrypt the data structure using the encryption key. In some implementations, the secure access engine 114 may encrypt each record received from a particular data source 180 individually. In some implementations, the secure access engine 114 may encrypt data matching the participant identifiers obtained from a local data source separately from data received from remote data source servers 180. All encrypted data is locatable using the participant identifiers and stored as a data record in cache 124. In some implementations, the cache 124 may be memory on a configurable cache server. The cache server may be configured to clear all data in the cache 124 periodically, the period being configurable. The period may be referred to as a refresh rate. The data in the cache 124 thus expires periodically and its expiration time is dependent on the refresh rate, such as, for example, cache data expiring every four hours. In some implementations, the secure access engine 114 may run a clean-up procedure that clears records in the cache 124 that have expired, e.g., based on an expiration time. The secure access engine 114 may normalize or otherwise format data received from one or more of the data source servers 180 prior to encryption. In some implementations, the secure access engine 114 may parse and format all data retrieved into a standard format, or a common format/data structure before encrypting.

Figure 3:
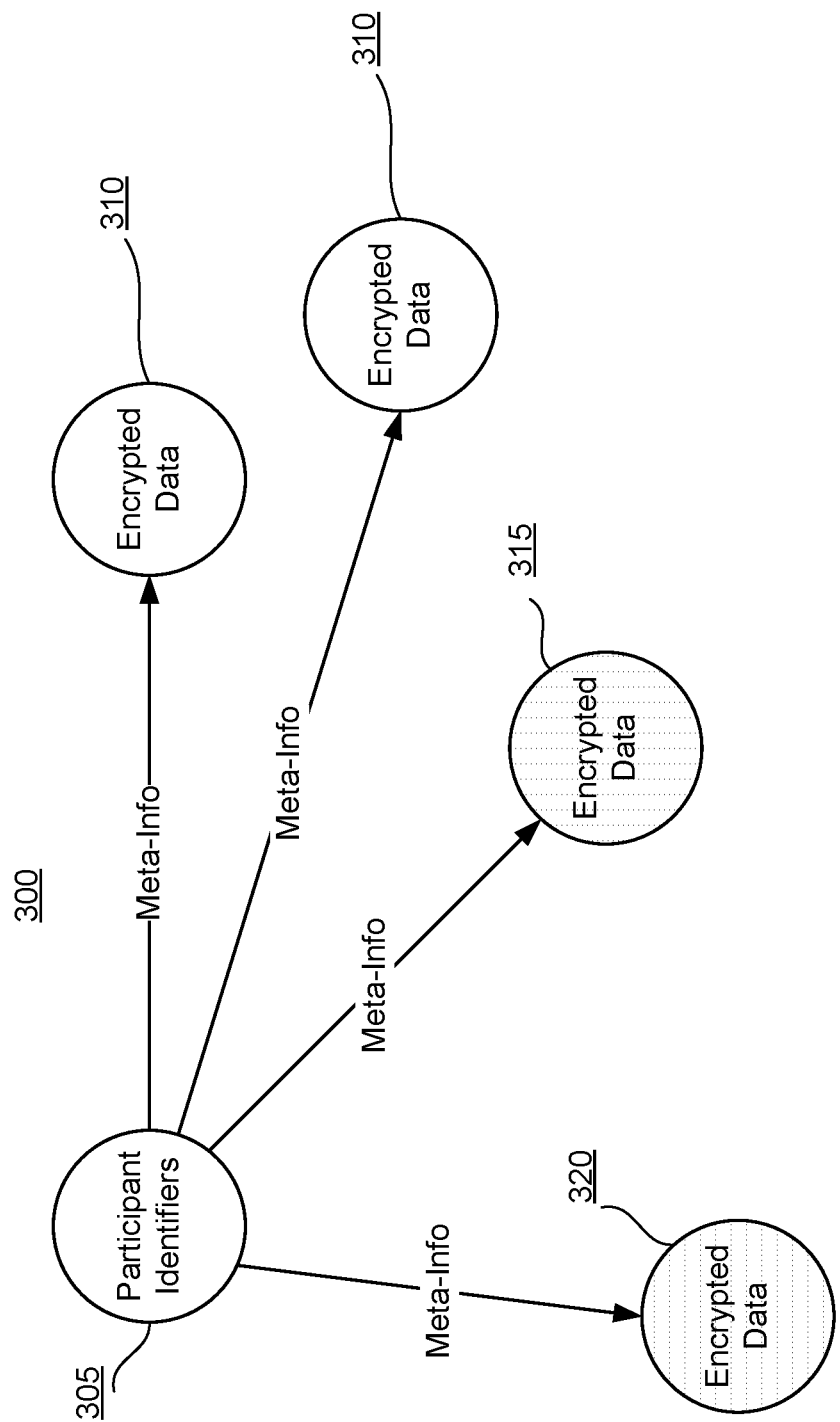
FIG. 3 shows an exemplary tree-based data structure used to temporarily store encrypted data, according to a disclosed embodiment.

In some implementations, the secure access engine 114 may organize the data into a tree structure and encrypt the nodes in the tree. FIG. 3 shows an exemplary tree-based data structure used to temporarily store encrypted data, according to a disclosed embodiment. As illustrated in FIG. 3, the root node 305 includes the participant identifiers, or in other words fields that uniquely identify a particular request. The participant identifiers can thus include information that identifies a subject person or entity for which information is sought from the data sources as well as information that identifies the requestor. The root node 305 is locatable using the participant identifiers. The root node includes one to many edges, or pointers, to other nodes in the tree. These edges may be associated with labels that indicate the type of information stored in the child node.

The leaf nodes 310, 315, and 320 in the tree 300 include the data retrieved from local and remote sources. The shading of the leaf nodes in FIG. 3 indicates a source of the data. For example, nodes 310 may have been obtained from data source server 180a, node 315 from data source server 180b, and node 320 from data source server 180n. For example, data source server 180a may provide multiple data records, each as an HTML page and the secure access engine 114 may encrypt each HTML page separately. In other implementations, the secure access engine 114 may scrape the data elements from the HTML pages, combine the data into a common format, e.g., an XML file, and encrypt the XML file. In this example the tree 300 would have only one leaf node 310. The meta-info of FIG. 3 may include a label indicating what type of data is stored in the node. Thus, for example, the meta-information may indicate the source of the data. In some implementations the meta-information may be used to determine an encryption method.

Returning to FIG. 1, once the secure access engine 114 has encrypted the data, the secure access engine 114 stores the encrypted data as data records in memory, for example, in cache 124. Although labeled as cache memory, cache 124 may be any type of memory used to store data, e.g., in databases. In some implementations, the cache 124 is memory in a configurable cache server, which may be configured to clear all data from cache 124 on a periodic basis.

The secure access engine 114 stores the information used to build the encryption key as a key record in a separate memory that is fast and short-term, for example cache key storage 122. The cache key storage 122 may be any fast, short-term memory, such as a cache register, cache, main memory, DRAM, flash, etc. In some implementations, the cache key storage 122 may be part of a cache server that clears the cache key storage 122 on a periodic basis, e.g., along with cache 124. In some implementations, the secure access engine 114 may clear expired records from the cache key storage 122. In such implementations, the key record may be associated with an expiration time. The secure access engine 114 stores the key records separately from the data records to increase security. In a distributed environment, e.g., with a plurality of machines having cache and cache registers, the key record for a particular request may be stored on a different machine that the corresponding data record for that request. Because both data records and the key records are designed for temporary storage, and because the data is encrypted and the encryption key is not stored, it is difficult if not impossible for a bad actor to locate the key record, determine how to build an encryption key using the information in the key record, locate the separately stored data record, and decrypt the data before the data is cleared. Hashing the participant fields prior to storage in the cache key storage 122 and the cache 124 further increases security. Moreover, the cache 124 that the data record is stored in may be on a different machine than the cache key storage 122 storing its corresponding key record, which further increases security. The encryption method used may also be configurable, so that not all records stored in the cache 124 are encrypted using the same method, further increasing the security of the encrypted data.

Figure 2:
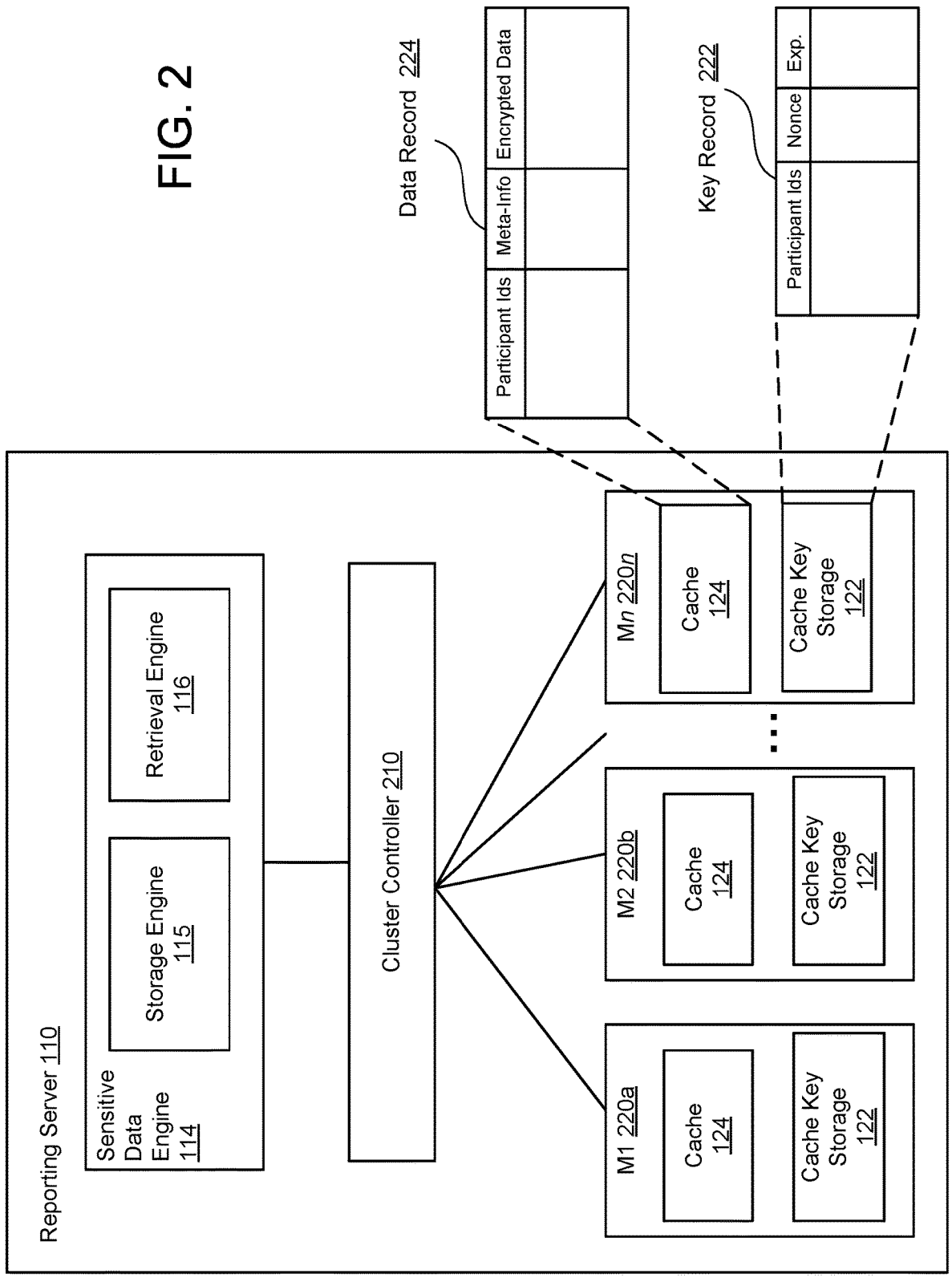
FIG. 2 describes a high level depiction of an example reporting server configured to obtain and temporarily store distributed data according to a disclosed embodiment.

FIG. 2 describes a high level depiction of an example reporting server 110 configured to obtain and temporarily store distributed data, according to a disclosed embodiment. In the example of FIG. 2, the secure access engine 114 stores the data records and key records in a plurality of machines 220 controlled by a cluster controller 210. Each machine 220 may be a separate computing device or may be a logical partition of a mainframe or server. Each machine 220 has a local cache 124 and a local cache key storage 122. Although the data records stored in the cache 124 and the key records stored in the cache key storage 122 are temporary (i.e., have an expiration), the reporting server 110 may handle a high volume of requests, e.g., in excess of 25,000 requests per hour. Distributing the cache 124 and cache key storage 122 across multiple machines enables the reporting server 110 to handle the high volume. In some implementations, a key record in the cache key storage 122 and its corresponding data record in cache 124 may be stored on different partitions. Separating the key record and the data record in this manner provides an extra layer of security but increases latency.

FIG. 2 also illustrates an example data record 224 and key record 222. The key record 222 includes participant identifiers, a nonce, and may include a time stamp, such as, for example, an expiration time. In some implementations, the time stamp may be a time associated with generation of the nonce. The key record may expire at some pre-determined time after it is created. In some implementations, the key records may expire at a pre-determined time in the future, e.g. a pre-determined time period added to the time stamp generated with or for the nonce. In some implementations, the nonce may be the time stamp, and the expiration time is not expressly stored. As another example, the cache key storage 122 may be cleared on a periodic basis, so the expiration time is based on the refresh rate and not explicitly stored. The key record 222 is locatable using the participant identifiers. In some implementations, the participant identifiers in the key record 222 may be hashed. In other words, the system may apply a hash to the participant identifiers and store the hash with the nonce. This is a one-way lookup that makes the key records even more secure.

The data record 224 includes the participant identifiers and encrypted data and may also include meta-information. In a self-consistent design, the participant identifiers are the same participant identifiers included in the key record 222. The data record 224 is locatable using the participant identifiers. In some implementations, the participant identifiers in the data record 224 are hashed. In some implementations, the hash used on the participant identifiers in the data record 224 may be different from a hash used on the participant identifiers in the key record 222. In such an implementation, the values stored in the participant identifiers field will not match, making the temporary storage of the data record and the key record even more secure. The encrypted data is the data retrieved from the data source servers and/or a local data store and encrypted using the encryption key built using one or more of the participant identifiers and the nonce. The encrypted data is also referred to as an encrypted portion of the data record. The meta-information may describe the type of data stored in the encrypted data portion of the data record 224. For example, the meta-information may indicate the source of the data record 224. For example, if the data is PDMP data, the meta-information may indicate the associated state or the particular system the encrypted data was obtained from, the date on which or the date range in which the prescription was filled. In general, the meta-information is any data that can be used to partition the encrypted data. Put another way, the meta-information represents filters that can be used to obtain different encrypted records without having to decrypt the data.

The environment 100 represents an example environment. Although illustrated with specific components in FIG. 1, the environment 100 may include additional components not illustrated, or may not include all elements shown. In addition, some components may be combined into a single component. For example, the functions of the reporting server 110 may be included in the enterprise system 130. As another example, one or more of the data source servers 180 may be combined with the reporting server 110 or the enterprise system 130. Moreover, the reporting server 110 and the secure access engine 114 are understood to be configured to comply with any applicable laws, regulations, or other conditions relating to the data input and the data obtained from the data sources.

Figure 4:
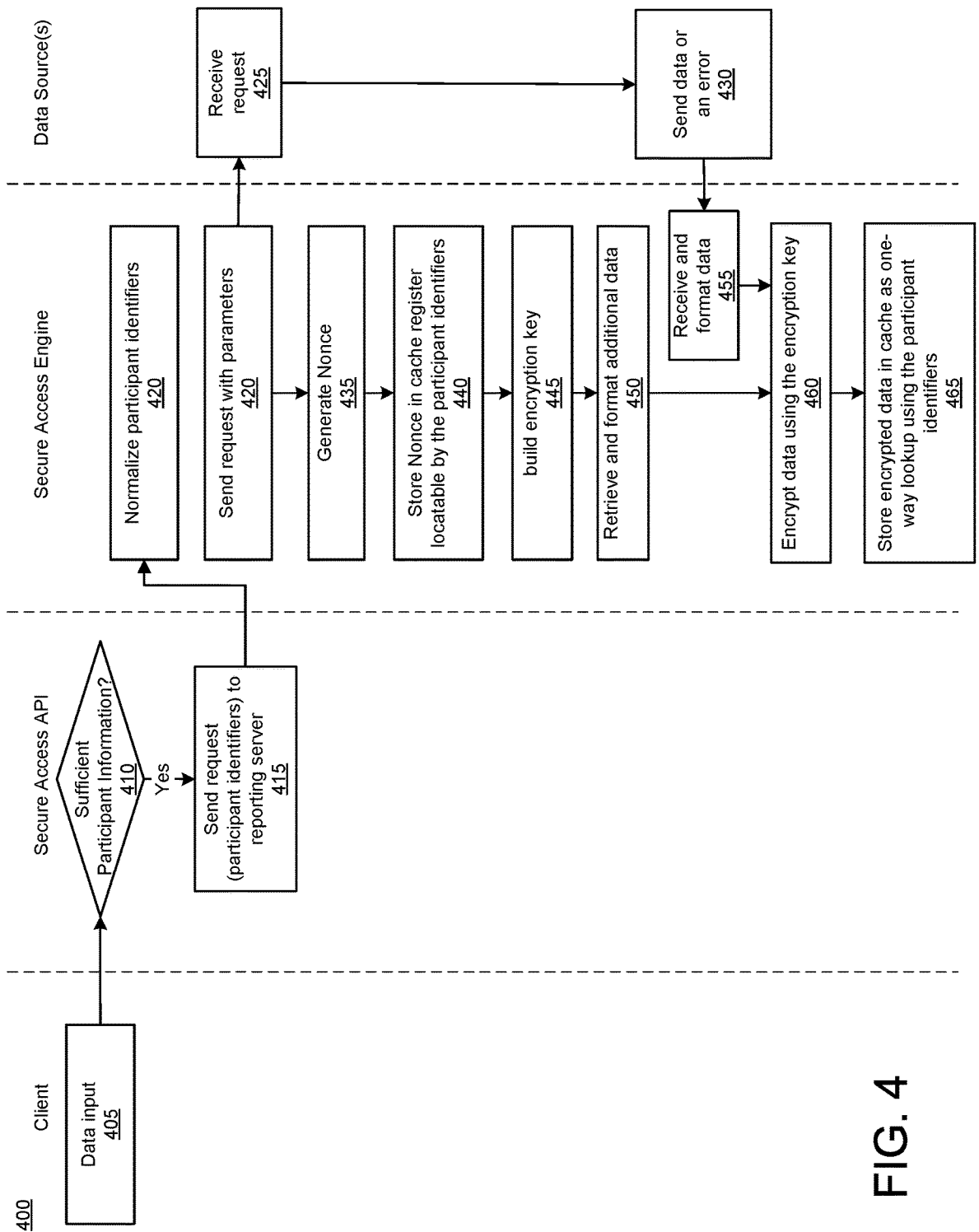
FIG. 4 illustrates a flowchart of an example process of fetching distributed data and temporarily storing it in a secure manner, according to a disclosed embodiment.

FIG. 4 illustrates a flowchart of an example process 400 of fetching distributed data and temporarily storing it in a secure manner, according to a disclosed embodiment. Process 400 is an example of a pre-fetch process, which decreases query latency. Process 400 takes data provided by a user, which includes a plurality of participant identifiers that uniquely identify a subject entity, such as, for example, a patient, to be searched, and participant identifiers that uniquely identify the requestor. Process 400 then obtains data records responsive to the subject entity information, builds an encryption key using the participant identifiers, encrypts the obtained data records, and temporarily stores the encrypted data and information used to build the encryption key. As not all participant identifiers need to be used to build the encryption key, it is understood that building the encryption key using the participant identifiers refers only to those participant identifiers used to build the encryption key, which may be a subset of the participant identifiers. The benefit of a pre-fetch process is that a data retrieval process that can take minutes to complete has already occurred prior to the requestor asking for the data, greatly reducing query latency. Process 400 may be expressly invoked as well. Process 400 may be performed by a reporting server, such as reporting server 110 of FIG. 1 and FIG. 2.

Process 400 may begin when the requestor is inputting data into a form (405). As one example, the form may be an electronic prescription form. A secure access API may be incorporated into the form or otherwise have access to the form and may observe the data input (410). The secure access API may be part of or included in the form receiving the data input. The form and the secure access API may be hosted on an enterprise system, e.g., an EMR system or other similar system. Once the secure access API determines that the data input provided by the requestor includes sufficient key information (410, Yes), the secure access API may make an automatic data prefetch request, sending the participant identifiers to the secure access engine of a reporting server (415). Step 410 is optional, as in some implementations the requestor may explicitly make a report request, providing the and selecting a control that invokes step 415 directly. The participant identifiers are sufficient when the user has provided values for the participant identifiers that the API requires, which does not already have a value for.

The secure access engine receives the participant identifiers and, optionally, may normalize the participant identifiers (420). Normalizing the participant identifiers may include converting an alphanumeric birthdate to just numeric values, formatting the birthdate into YYYMMDD format, removing spaces or special characters from names, etc. The secure access engine begins sending requests to one or more data sources, e.g., data source servers 180 (420). The method of making a request is dependent on the interface used to communicate with the data source. In some implementations, the request may be via an API that enables the secure access engine to provide parameters taken from one or more participant identifiers and receive one or more records in return. In some implementations, the request may be made via a user portal, where the secure access engine simulates a user making an HTML request, as explained below with regard to FIG. 6. Although FIG. 4 illustrates only one request to one data source, step 420 includes sending multiple different requests to different data sources. In some implementations, these requests are performed concurrently.

The data source receives the request, processes it, and sends data responsive to the request or provides an error (430). The secure access engine receives the responsive data and may optionally format the data received (455). For example, the secure access engine may parse the responsive data, extracting data fields and discarding other information, such as formatting data. The formatting may include putting the data fields into a common format, or in other words a format used no matter what source the data is received from. If an error is received, in some implementations no further action is taken with regard to that data source. In some implementations, the secure access engine may generate a data record indicating that no data was found. This data record may be locatable using the participant identifiers and may or may not be encrypted. In some implementations, where process 400 is not a pre-fetch process, the secure access engine may return an error message responsive to determining no data source returned a record. Concurrently with making the requests and awaiting a response, the secure access engine may generate a nonce for the request (435). The nonce can be any data specifically generated for the request. The size of the nonce may be dependent on the difference between the size of the encryption key and the size of the participant identifiers used to build the encryption key. In some implementations, the nonce may include a time stamp. The time stamp may go to hundredths or even thousandths of a second. The time stamp may or may not include a date. The nonce may also be randomly generated. In some implementations, the random generation may use a time stamp as a seed. The secure access engine may store the nonce as a key record in fast, temporary memory, for example a cache register. The nonce is locatable in the memory using the participant identifiers. Thus, a key record may include the participant identifiers and the nonce. In some implementations, the key record also includes a time stamp or an expiration time.

The secure access engine may also build an encryption key using the participant identifiers and the nonce (445). In some implementations, not all participant identifiers are used to build the encryption key. In such an implementation, the used to build the encryption key are referred to as encryption participant identifiers. In some implementations, one or more of the encryption participant identifiers may be transformed or altered before building the encryption key. For example, the values may be shifted, altered using a mask, mapped to different values, multiplied, etc. In some implementations, the nonce and the encryption participant identifiers (or the transformed encryption participant identifiers) may be concatenated to build the encryption key. In some implementations, the nonce and the encryption participant identifiers may be interleaved to build the encryption key. The method of building the encryption key can be configurable, e.g., with different enterprise systems using different methods.

In some implementations, the secure access engine may also obtain additional data that is responsive to the participant identifiers (450). The additional data may be local to the secure access engine. In some implementations, the additional data may be formatted, similar to the received data. In some implementations, the additional data may be added to the received data (i.e., the data received at step 455). Step 450 is optional.

The secure access engine uses the encryption key to encrypt the data (460). The encrypted data is stored as a data record in a memory, e.g., a cache (465). The memory may be distinct from the memory storing the key record generated at step 440. The data record is locatable using the participant identifiers. In some implementations, the participant identifiers in the data record are hashed, making the look up a one-way lookup. In other words, the system may use a hash of the participant identifiers to locate the encrypted data. In some implementations, the data record may also include meta-information. The meta-information may be data describing the type of data encrypted. For example, the meta-information may describe a source of the data. As another example, the meta-information may describe an attribute of the data (e.g., a class or scheduling of a controlled substance, or a state where the controlled substance was filled where the data represent filled prescriptions). In some implementations, the meta-information may be dependent on a type or category of requestor, e.g., a request from a physician may use different meta-information than a request from an insurance company. Process 400 is then complete for the request. It is understood that a reporting server may perform process 400 concurrently for different requests and may process thousands of requests per hour.

Process 400 results in a temporary pre-fetch of information that fulfills a particular request. For example, process 400 may be used to pre-fetch all information related to controlled substance prescriptions for a particular patient. In contrast, conventional systems provide this data one page at a time. Because implementations can collect any available information concurrently, such implementations eliminate the delay incurred in conventional systems for 'next page' requests. Such requests are referred to as "duplicate requests" as they are from the same requesting entity for the same subject entity. Duplicated requests for a subject entity in PDMP systems have been found to occur 5-15 times per physician access, at 6-20 seconds per access. Using the result of process 400, request response time can drop to milliseconds per requesting entity/subject entity.

Figure 5:
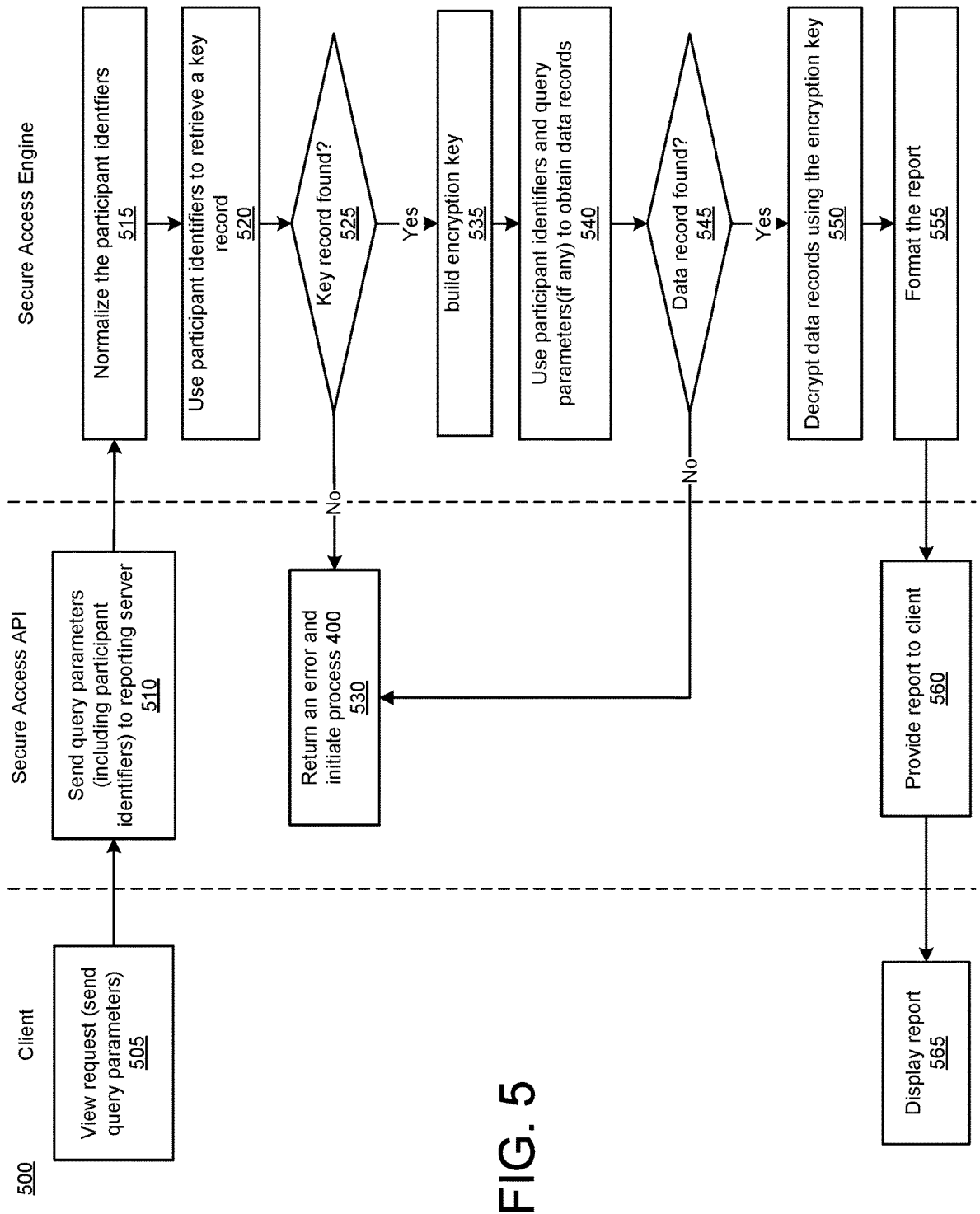
FIG. 5 illustrates a flowchart of an example process for retrieving temporarily stored secure data, according to a disclosed embodiment.

FIG. 5 illustrates a flowchart of an example process 500 for retrieving temporarily stored securely encrypted data, according to a disclosed embodiment. Process 500 is initiated by a report request (query) by a user/requestor. The report request provides query parameters, which include values for a plurality of participant identifiers and other optional meta-information. The values of the participant identifiers are used to locate data records and encryption key records, build an encryption key, and decrypt the encrypted portion of the located data records. The information from the decrypted data records is human readable and may be formatted and provided to the user/requestor. Process 500 may be invoked at the end of process 400 when process 400 is not a pre-fetch process. Process 500 may also be invoked by the user/requestor via a control. The control may also be made available after process 400 concludes or after at least one data record has been stored by process 400. Process 500 may be performed by a reporting server, such as reporting server 110 of FIG. 1 and FIG. 2.

Process 500 is initiated by a view report request at the client (505). The view report request may also be referred to as a query. The view report request includes query parameters. The query parameters include participant identifiers, the same participant identifiers used in process 400. The query parameters may also include meta-information. The meta-information may be used to narrow the data records returned in the report. For example, the report requestor may request data retrieved from specific sources or that has specific attributes. The report request may be made via the secure access API, which sends the request and the query parameters to the reporting server (510). The secure access engine at the reporting server may normalize the participant identifiers (515), as described above with regard to step 420 of FIG. 4. The secure access engine uses the participant identifiers to locate a key record from the fast, short-term memory (520). The secure access engine may determine whether a key record is found (525535). A key record may not be located if the key record has expired. A key record may also not be located if process 400 has not run for a corresponding request (e.g., entity/requestor). If no key record is located (525, No), an error may be returned (530). Alternatively, or additionally, the secure access API may initiate process 400 using the participant identifiers. This would be considered an express invocation of process 400 and not a pre-fetch.

If a key record is found (525, Yes), the secure access engine builds the encryption key using the nonce identified in the key record (535). The encryption key is built in the manner described above with regard to step 445 of FIG. 4. The secure access engine also uses the participant identifiers and, optionally additional query parameters, to locate data records, e.g., from the cache (540). The meta-information in the query parameters, if used, may be matched to the meta-information stored in the data records to filter data records located using the participant identifiers. In some implementations, the secure access engine may also filter data records to comply with conditions set by the data source. For example, PDMP data from one state may have a restriction that does not allow display of the data to physicians practicing in other states. The secure access engine may filter the data records to comply with such restrictions. The secure access engine determines whether data records are found (545). If no data records are found (545, No), an error message is returned, as described above (530). If data records are found (545, Yes), the secure access engine uses the encryption key to decrypt the data record(s) (550). The secure access engine may format the decrypted data records for reporting, i.e., so they are readable by a human requestor (555). In some implementations, this step is optional as the data records are encrypted in a reporting format, so no further formatting is needed. The report is provided to the client (560) and the client displays the report (565). Process 500 then ends.

Figure 6:
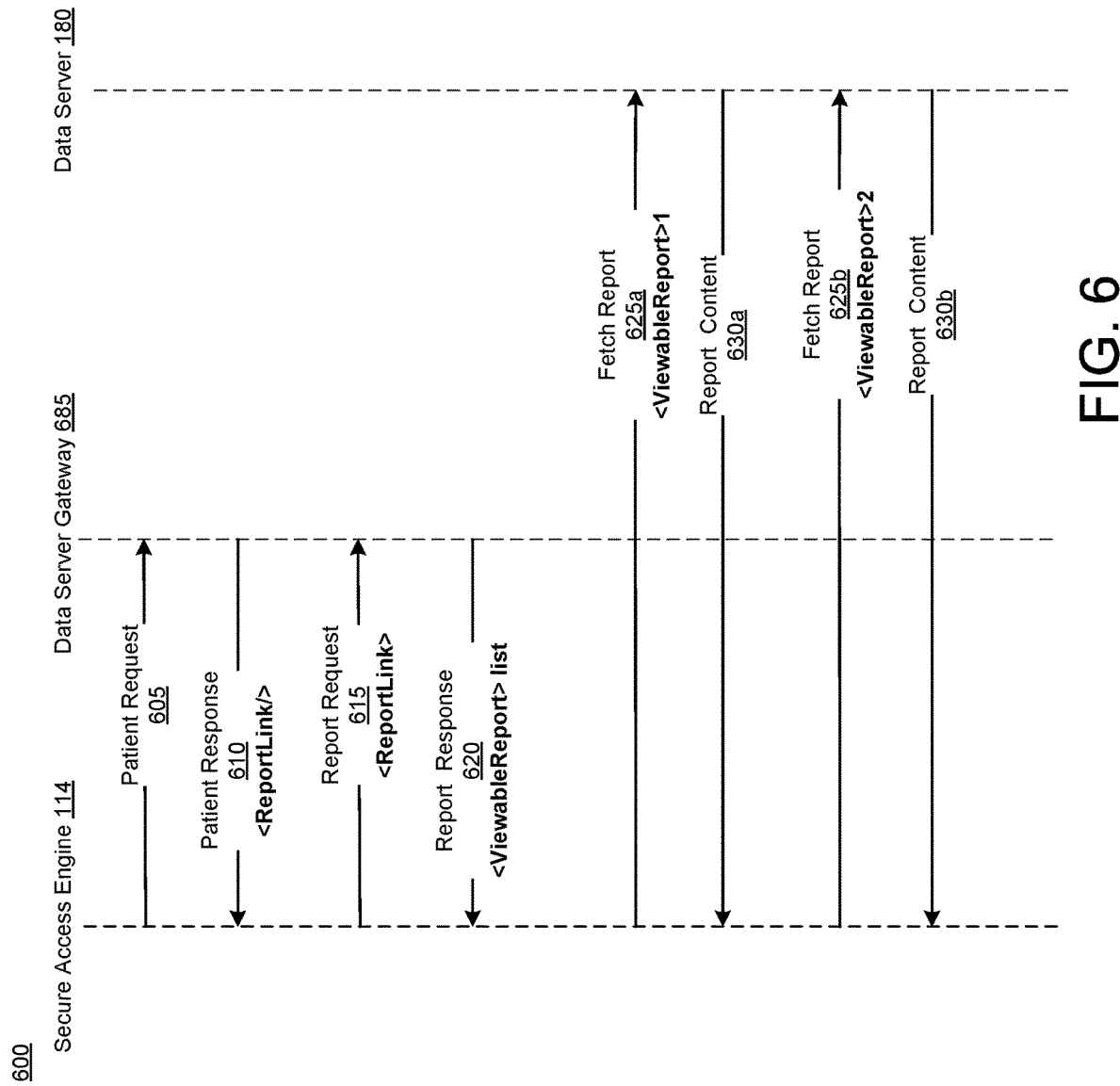
FIG. 6 illustrates a flowchart of an example process for automatic retrieval of distributed data from an HTML portal, according to a disclosed embodiment.

FIG. 6 illustrates a flowchart of an example process 600 for automatic retrieval of distributed data from an HTML portal, according to a disclosed embodiment. Process 600 may be used where the secure access engine simulates a human user interacting with a web-based portal for requesting information. The secure access engine may have a contractual relationship with the web-based portal that enables the secure access engine to simulate the human user. Process 600 may be used where the data server lacks an interface for back-end processes to access the data. Process 600 is a non-limiting example of retrieving data from distributed data sources as part of steps 420, 425, 430, and 455 of FIG. 4. In some implementations, the secure access engine may establish an interactive session with the data server and maintain the interactive session until the data request is complete. To maintain the connection, the secure access engine may identify a session identifier, status information, and other similar information for the HTTPS responses provided by the data server and/or its gateway. The secure access engine may close the session once the data request is complete. In some implementations the secure access engine may complete an authentication process on behalf of the requestor as part of establishing the session. The secure access engine may maintain an audit trail of the session. Although process 600 is described as a process for obtaining PDMP data for a patient, implementations are not limited to this scenario as process 600 can be adapted to other types of data requests using similar techniques.

Process 600 begins by sending a subject patient request to a gateway of the data server (605). The subject patient request includes participant identifiers that the data server 180 needs to complete a request. The subject patient request is formatted as an HTTP request recognizable by the data server gateway 685. The secure access engine 114 receives a response related to the subject patient (610). The response may be an HTTP response. In some implementations, the response may include one or more report links. In such implementations, the secure access engine 114 may parse the response for a report link. The secure access engine 114 may simulate selection of the report link, sending a report request to the data server gateway (615). The secure access engine 114 receives a report response that includes a list of viewable reports. In some implementations, step 615 is optional and the response to the HTTP request is the report response that includes a list of viewable reports. In the example of FIG. 6, the viewable reports include information on individual filled prescriptions from a particular state. The viewable report list may include a series of links, each link showing one of the filled prescription events. The secure access engine 114 may parse the viewable report list for the links and send a fetch report request with one of the links (625a). The fetch report request is an HTML request simulating selection of the link. The data server provides the report content in an HTML response (630a). The secure access engine 114 receives the report content and may parse the content, format it, and encrypt it as a data record. When parsing and formatting, none of the PDMP data is modified; rather HTML tags and formatting may be removed or changed. The secure access engine 114 may also encrypt the report content as received as a data record. The secure access engine 114 may also combine the report content with report content from other reports (e.g., 625b and 630b, etc.) and encrypt the combined data. The secure access engine 114 may continue sending fetch report requests (e.g., 625b, etc.) and receiving report content (630b, etc.) until all viewable reports in the viewable report list are processed. Process 600 then ends.

Figure 7:
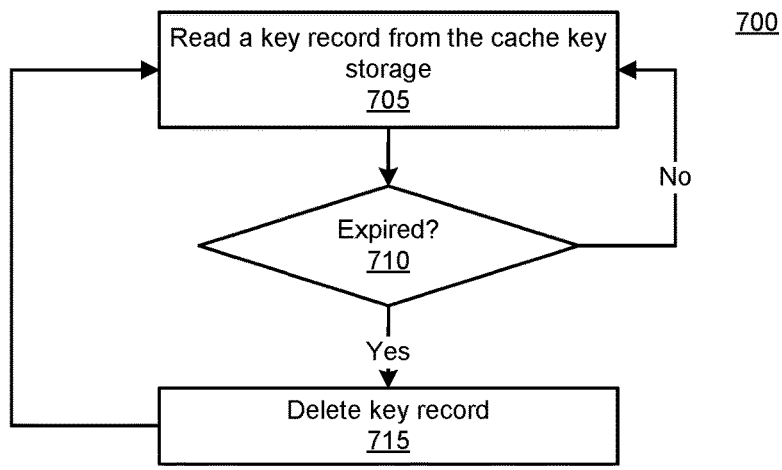
FIG. 7 illustrates a flow diagram of removing key records from temporary storage, according to a disclosed embodiment.

FIG. 7 illustrates a flow diagram of removing key records from temporary storage, according to a disclosed embodiment. Process 700 may be used in an implementation where the key records have an expiration field and are not cleared periodically, e.g., every hour or every four hours, etc. While process 700 is described as deleting key records, implementations also include adaptations deleting data records that have an associated expiration field. In some implementations, process 700 is performed continually at the reporting server. In some implementations, process 700 is performed periodically, e.g., every minute, at the reporting server. Process 700 begins by reading a key record from the fast, short-term memory (705). The secure access engine determines whether the key record has expired based on the expiration field (710). If the key record has expired (710, Yes), it is deleted from the fast, short term memory (715). This means that the corresponding data records can no longer be decrypted. In some implementations, the corresponding data record is located and deleted from the cache memory. After deleting the key record, or if the key record has not expired (710, No), process 700 continues with the next key record in the fast, short-term memory. Process 700 may end when all key records have been processed.

Figure 8:
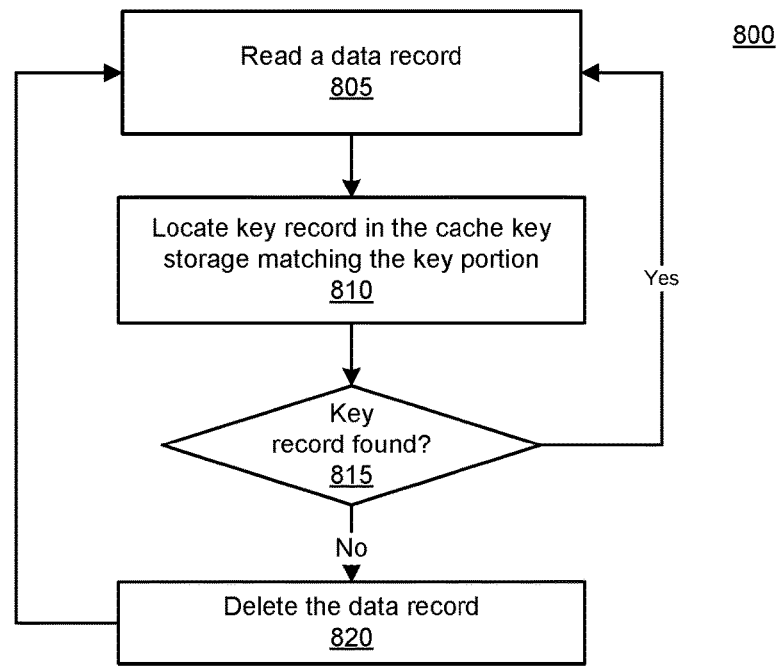
FIG. 8 illustrates a flow diagram of removing data records from temporary storage, according to a disclosed embodiment.

FIG. 8 illustrates a flow diagram of removing data records from temporary storage, according to a disclosed embodiment. Process 800 may be used in an implementation where the key records have an expiration field and are not cleared periodically, e.g., every hour or every four hours, etc. While process 800 is described as deleting data records without a corresponding key record, implementations also include adaptations deleting key records without a corresponding data record. Process 800 is performed in conjunction with process 700. Process 800 begins by reading a data record from the cache memory (805). The secure access engine attempts to locate a corresponding key record using the participant identifiers (810). If the key record is not found (815, No), the data record is deleted from the memory (820). After deleting the data record, or if the key record was located (815, Yes), process 800 continues with the next data record in the memory. Process 800 may end when all key records have been processed.

A working example in the healthcare industry is now described. This example is provided to aid in the understanding of this disclosure and implementations are not limited to the specific scenario described, as the methods and techniques can be adapted to other types of reporting environments. Implementations thus include adaptations of the underlying technology and techniques to other industries.

Healthcare data is one example of sensitive data that is subject to regulations. For example, United States federal law (Prescription Drug Monitoring Program or PDMP) requires that each state track filled prescription information, and each U.S. state has selected an entity (e.g., APRISS, DR. FIRST, HID, CRISP, etc.) to track this data. These entities may also be referred to as PDMP providing entities. Each PDMP providing entity runs a portal for the physicians to look up patient data, for example to be sure that the patient for whom the physician is writing a prescription is not obtaining the same medication from a different physician. If a physician lives in a multi-state area, the physician must log in to each neighboring state's portal to obtain the information for a patient. This is time consuming even for one state, e.g. each request taking 9 to 15 seconds per request (e.g., per person/prescriber/state). Thus, reviewing the information for one patient can take a minute or more. Doing this for multiple states (e.g., requiring the doctor to log into several different portals) is, in reality, unworkable, as physicians do not have extra minutes to spend trying to access this information.

There can also be regulations on the data, for example prohibiting non-temporary storage and modifications to the data and requiring secure transport of any data. In addition, some states grant access to the PDMP data to physicians practicing in other states (e.g., physicians who do not have a medical license in the state) and some states do not. Moreover, each PDMP providing entity can decide in what format to share the data. Some PDMP providing entities also provide an API for requests of data from backend systems. A backend system is a computing device, such as reporting server 110, that is configured to request data from other computing devices without a human user directing each operation. Some PDMP providing entities only provide the physician portal. Therefore, there is not a common data format and not always a designated way for a backend system to request data. The regulations and the differing state implementations of the PDMP program make it a technologically difficult problem to comply with regulations and present a complete picture to any one physician.

Implementations may use an API integrated into an electronic prescription program. The electronic prescription program may be operated by an EMR enterprise system and used by physicians after two-factor authentication. Once the physician has entered the patient's name and date of birth, the API may send that information, along with the physician's National Provider Number (NPI), medical license number, a token, and/or some other data element identifying the physician as participant identifiers in a report request to the reporting server. The information about the provider may be known because the provider has authenticated to the electronic prescription program. The reporting server begins obtaining PDMP data for the patient while the physician continues to fill out the electronic prescription form. For example, implementations may begin requesting the data from one or more of the PDMP providing entities. In some implementations, the system may request data from every state simultaneously. In some implementations, the system may request data from states in the vicinity of the physician. The vicinity may be measured by some pre-determined distance in miles, or by states neighboring the state from which the request is made. The system makes these requests before the physician is finished with the prescription. In other words, as the physician continues to provide medication and dosage information, as well as any instructions, the system has already started pre-fetching the PDMP data for the patient. The system receives the data records from the various PDMP providing entities (the data sources) and encrypts the data, as disclosed herein, using an encryption key built using a nonce and the participant identifiers. A key record is also generated, storing the nonce and the participant identifiers.

When the physician is finished filling out the prescription, the physician may select a 'view PDMP report' control. In some implementations, this control may be hidden until at least some of the data has been retrieved. In some implementations, the physician may be able to provide meta-information for the report, e.g., specifying which states to view, specifying a time frame, controlled substance category, controlled substance scheduling, or any other meta-information used to partition the encrypted data. The meta-information are provided, e.g., via the API, to the reporting server along with participant identifiers as query parameters. The participant identifiers are used to locate a key record storing the nonce used to build the encryption key for this request. Once the key record is located, the encryption key is built and the reporting server locates data records matching the participant identifiers. In some implementations, the reporting server uses meta-information to filter data records, e.g., only retrieving data record having meta-information that match the query parameter(s). The meta-information can identify data attributes or sources used to filter information returned for the report. For example, meta-information in a PDMP system may include a class or scheduling of a controlled substance, a state where the controlled substance was filled, a date or date range associated with the dispensing of the controlled substance, etc. In addition, the reporting server may automatically filter data records. For example, if a physician practicing in Virginia requests PDMP data for Virginia, Maryland, West Virginia, and the District of Columbia, but West Virginia does not allow its PDMP data to be shared with other states, the reporting server may filter PDMP data records from West Virginia, so that these data records are not provided in response to the query. In this manner the reporting server is configured to comply with any applicable rules, regulations, statutes, or other conditions. The reporting server decrypts the encrypted portions of the data records using the encryption key and may provide the data records to a presentation layer, which formats the data as a report for display to the physician. In some implementations, the report may include a control for requesting additional records. For example, in some implementations, the filled prescriptions may be presented one-at-a time by the presentation layer and the user interface for viewing the report may include a "next" button. Accordingly, the reporting server can begin providing data for the report before all requests for data from the data sources have been completed. If the physician has logged of, timed out, or switched patients, the key record may not be found and no report can be shown to the physician. Similarly, if the physician waits too long to view the report, the key record might have been cleared and will not be found.

Without the techniques disclosed herein, the physician would need to finish filling out the electronic prescription and then log into the first PDMP providing entity's portal, locate the patient's data, and scroll through the filled prescriptions. This can take 6-20 seconds for the request plus login time, e.g., a minute or more. This process must be repeated for each PDMP providing entity. The pre-fetch techniques, which tie participant identifiers to a particular patient/physician request and build an encryption key unique to the patient/physician request, reduces the query latency to a few milliseconds, as prefetched data is obtained from cache, and eliminates the burden of multiple logins to different portals. All of these features improve a search system.

In addition to the configurations described above, an apparatus can include one or more apparatuses in computer network communication with each other or other devices. In addition, a computer processor can refer to one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display. An apparatus or device refers to a physical machine that performs operations, for example, a computer (physical computing hardware or machinery) that implement or execute instructions, for example, execute instructions by way of software, which is code executed by computing hardware including a programmable chip (chipset, computer processor, electronic component), and/or implement instructions by way of computing hardware (e.g., in circuitry, electronic components in integrated circuits, etc.)— collectively referred to as hardware processor(s), to achieve the functions or operations being described. The functions of embodiments described can be implemented in any type of apparatus that can execute instructions or code.

More particularly, programming or configuring or causing an apparatus or device, for example, a computer, to execute the described functions of embodiments creates a new machine where in case of a computer a general purpose computer in effect becomes a special purpose computer once it is programmed or configured or caused to perform particular functions of the embodiments pursuant to instructions from program software. According to an aspect of an embodiment, configuring an apparatus, device, computer processor, refers to such apparatus, device or computer processor programmed or controlled by software to execute the described functions.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blu-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

In one general aspect, a system includes at least one processor, fast, short-term memory storing a plurality of key records, a cache storing a plurality of data records, and memory storing instructions that, when executed by the at least one processor, cause the system to perform operations. Each key record stored in the fast, short-term memory includes a nonce and is locatable using participant identifiers. The key records are deleted after a preset time period. Each data record stored in the cache includes an encrypted portion and is locatable using the participant identifiers. The operations include receiving a query that includes query parameters, the query parameters including first participant identifiers, and obtaining a first nonce, the first nonce being associated with the first participant identifiers in the fast, short-term memory. The operations also include obtaining a subset of data records from the plurality of data records in the cache, the subset of data records being associated with the first participant identifiers in the cache and building an encryption key using the nonce and the first participant identifiers. The operations include decrypting the encrypted portion of each data record in the subset of data records using the encryption key to generate report data and providing the report data as a response to the query.

These and other aspects can include one or more of the following features. For example, the nonce can include a nonce string and a nonce time stamp. As another example, the participant identifiers may identify at least a requesting entity and a subject entity. As another example, building the encryption key can include transforming the participant identifiers. As another example, a method used to build the encryption key may be dependent on at least one field of the first participant identifiers or on a query parameter. As another example, a method of encryption used for decrypting the encryption portion of the data record may be dependent on a source of the data record, the source being identified in meta-information for the data record. As another example, a method of encryption used for decrypting the encrypted portion of the data record may be dependent on a type of data encrypted by the encrypted portion of a data record in the subset of data records. As another example, the system may include a cluster of a plurality of machines and the fast, short-term memory and the cache are distributed among the plurality of machines. As another example, the encryption key may be built from a time stamp, the nonce, and one or more participant identifiers. As another example, the expiration time may be based on a periodic clearing of memory. As another example, the expiration time is based on a time stamp associated with the nonce. As another example, the data records may be stored in a tree structure. In such implementations, each data record includes a root node, the root node being locatable using the participant identifiers and a plurality of leaf nodes, each leaf node representing data received from a data source, a link pointing to the leaf node indicating the data source. A data record is read by following links from the root node to the plurality of leaf nodes.

In one general aspect, a method of pre-fetching report data from a plurality of remote data sources includes receiving participant identifiers related to a data input event, the participant identifiers identifying an entity and a requestor for the data input event, generating a nonce and associating the nonce with the participant identifiers in a cache register, the cache register having a refresh rate, and building an encryption key using the nonce and the participant identifiers. The method also includes requesting data from each of at least two remote data sources, the data being responsive to a query having at least one of the participant identifiers identifying the entity as a parameter, encrypting the data using the encryption after receiving the data from the at least two remote data sources, and storing the encrypted data as a data record in a cache, the cache being distinct from the cache register. The method also includes, responsive to the storing, activating a control in a user interface that, when selected, initiates a reporting method that includes building an encryption key from the nonce and participant identifiers provided as parameters, decrypting data records using the encryption key, the data records being located using the participant identifiers, and providing the data records to the requestor.

These and other aspects can include one or more of the following features. For example, the method may also include selecting an encryption method based on the data source. As another example, building the encryption key can include transforming the nonce and the participant identifiers. As another example, building the encryption key may include combining a subset of the participant identifiers with the nonce.

In one general aspect, a method includes receiving a plurality of participant identifiers, obtaining data from a data source using at least some participant identifiers of the plurality of participant identifiers, generating a nonce, building an encryption key using the participant identifiers and the nonce, and encrypting the obtained data using the encryption key. The method also includes adding a key record in fast, short-term memory, the key record including the nonce and the plurality of participant identifiers, the key record having an associated expiration time and being locatable using the plurality of participant identifiers and storing the encrypted data as a data record in a cache, the data record being locatable using the plurality of participant identifiers, the cache being a different location than the fast, short-term memory. The method also includes, responsive to a subsequent query having the plurality of participant identifiers as parameters, the query being received prior to the expiration time, locating the key record using the parameters, building the encryption key using the participant identifiers and the nonce, decrypting the data record, and providing the data as a response to the subsequent query.

These and other aspects may include one or more of the following features. For example, the fast, short-term memory may be a cache register. As another example, the fast, short-term memory in which the nonce is stored may be on a different machine than the cache in which the encrypted data is stored. As another example, encrypting the obtained data can include determining an encryption algorithm based on at least one participant identifier of the plurality of participant identifiers or based on the data source and using the encryption algorithm in the encrypting and the decrypting. As another example, the plurality of participant identifiers may be received from an API incorporated into a form, the API sending the participant identifiers prior to completion of the form. As another example, the expiration time may be based on a refresh rate of a cache server.

What is claimed is:

1. A system comprising:
    at least one processor; and
    memory storing instructions that, when executed by the at least one processor, causes the system to perform operations including:
        receiving a query including requestor data identifying a user using a data entry interface and including subject entity data identifying a subject entity selected by the user using the data entry interface,
        locating a key record using the requestor data and the subject entity data, the key record storing a respective nonce,
        building an encryption key from the respective nonce and at least one of the requestor data or the subject entity data,
        locating a data record using the requestor data and the subject entity data, the data record storing a respective encrypted portion representing data relating to the subject entity,
        decrypting the respective encrypted portion using the encryption key to generate data records relating to the subject entity; and
        providing the data record relating to the subject entity as a response to the query.

2. The system of claim 1, the operations further including:
    a cache storing a plurality of data records, each data record including an encrypted portion, the data record being locatable using requestor data and subject entity data,
    wherein the data record is stored in the cache.

3. The system of claim 1, wherein the data record is stored in in short-term memory that is refreshed at a refresh rate.

4. The system of claim 1, wherein the key record is deleted after a predetermined time.

5. The system of claim 1, the operations further including:
    formatting the data records relating to the subject entity into a report and providing the report as the response to the query.

6. The system of claim 1, the operations further including:
    receiving, with the query, a filter parameter;
    locating a plurality of data records using the requestor data and the subject entity data; and
    using the filter parameter to select responsive data records from the plurality of data records, the responsive data records satisfying the filter parameter,
    wherein the data record is one of the responsive data records.

7. The system of claim 6, wherein the filter parameter represents data that is unencrypted in the data record, so that using the filter parameter occurs prior to decrypting the respective encrypted portions.

8. The system of claim 6, wherein the plurality of data records are organized in a tree structure, with the requestor data and the subject entity data being a root node of the tree structure and the respective encrypted portions being leaf nodes in the tree structure, and wherein the filter parameter represents a node or an edge connecting the leaf nodes to the root node.

9. The system of claim 1, wherein building the encryption key is a configurable process determined based on a data item provided with the query.

10. The system of claim 1, wherein the data record was retrieved from a remote data source prior to receipt of the query.

11. The system of claim 1, wherein the data entry interface is for an electronic prescription system and the data record is a data record from a prescription drug monitoring program.

12. The system of claim 1, wherein locating the key record using the requestor data and the subject entity data includes using the requestor data and the subject entity data as inputs to a one way look up algorithm.

13. The system of claim 12 wherein the key record is uniquely indexed by the requestor data and the subject entity data.

14. A method comprising:
    determining that a user has provided, via a data entry interface, data that uniquely identifies the user and a subject entity;
    sending, responsive to the determining, the data that uniquely identifies the user and the data that uniquely identifies the subject entity to a server;
    receiving, from the server, an indication that data records for the subject entity have been pre-fetched, wherein the server stores the pre-fetched data records for the subject entity in an encrypted portion of a data record, the encrypted portion being encrypted with an encryption key built from a nonce and one of the data that uniquely identifies the user or the data that uniquely identifies the subject entity; and
    responsive to receiving the indication, making available a control in the data entry interface, the control configured to send a report request to the server in response to selection of the control by the user, wherein the report request provides the data uniquely identifying the user and the subject entity and the server provides at least one of the pre-fetched data records in response to the report request.

15. The method of claim 14, further comprising:
    monitoring data input by the user entering data into the data entry interface,
    wherein determining that the user has provided the data that uniquely identifies the user and the subject entity is done as part of the monitoring.

16. The method of claim 14, wherein determining that the user has provided the data that uniquely identifies the user and the subject entity occurs before the user has finished completing data entry in the data entry interface.

17. The method of claim 14, wherein the data entry interface is an electronic prescription drug interface and the data records relating to the subject entity are data records from a prescription drug monitoring program.

18. The method of claim 14, further comprising:
responsive to selection of the control by the user, provide meta-information with the data uniquely identifying the user and the subject entity,
wherein the meta-information is used to select the pre-fetched data records provided in response to the report request.

19. The method of claim 14, wherein building the encryption key includes combining components of the encryption key in an order determined based on a value of data provided with the data that uniquely identifies the user and the subject entity.

20. The method of claim 14, further comprising:
receiving a selection of the control,
wherein in response to the selection occurring prior to an expiration of the nonce, the server provides the at least one pre-fetched data record, and
wherein in response to the selection occurring after the expiration of the nonce, the server provides an error in response to the selection.

\* \* \* \* \*

UNITED STATES PATENT AND TRADEMARK OFFICE
CERTIFICATE OF CORRECTION

PATENT NO. : 12,411,976 B2
APPLICATION NO. : 18/146063
DATED : September 9, 2025
INVENTOR(S) : Tang et al.

Page 1 of 1

It is certified that error appears in the above-identified patent and that said Letters Patent is hereby corrected as shown below:

In the Claims

In Column 23, Line 57, Claim 3, delete "in in" and insert --in--, therefor.

In Column 24, Line 32, Claim 13, delete "claim 12" and insert --claim 12,--, therefor.

Signed and Sealed this
Twenty-seventh Day of January, 2026

John A. Squires
*Director of the United States Patent and Trademark Office*